United States Patent
Dutta et al.

(10) Patent No.: US 7,305,446 B2
(45) Date of Patent: Dec. 4, 2007

(54) METHOD AND SYSTEM FOR PROCESSING INGRESS MESSAGES FOR A STATE BASED APPLICATION ASSOCIATED WITH A NETWORK PROCESSOR

(75) Inventors: Hemanta K. Dutta, Austin, TX (US); Seeta Hariharan, Raleigh, NC (US); Sridhar Rao, Raleigh, NC (US); Yanping Wang, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 766 days.

(21) Appl. No.: 10/699,976

(22) Filed: Nov. 3, 2003

(65) Prior Publication Data

US 2005/0114451 A1    May 26, 2005

(51) Int. Cl.
*G06F 15/16*    (2006.01)
(52) U.S. Cl. .............. 709/206; 709/207; 709/240; 719/313; 719/314; 719/103
(58) Field of Classification Search ........ 709/206–207, 709/238–242; 718/101–103; 719/312–315, 719/328–329
See application file for complete search history.

(56) References Cited

U.S. PATENT DOCUMENTS

| | | | |
|---|---|---|---|
| 5,313,638 A * | 5/1994 | Ogle et al. ................. 719/312 |
| 5,742,825 A * | 4/1998 | Mathur et al. .............. 719/314 |
| 5,784,615 A * | 7/1998 | Lipe et al. .................. 719/324 |
| 6,055,564 A | 4/2000 | Phaal ......................... 709/207 |
| 6,061,365 A | 5/2000 | Yeung et al. ............... 370/470 |
| 6,144,669 A | 11/2000 | Williams et al. ........... 370/401 |
| 6,205,471 B1 | 3/2001 | Gilchrist et al. ........... 709/206 |
| 6,353,616 B1 | 3/2002 | Elwalid et al. ............. 370/443 |
| 6,604,150 B1 * | 8/2003 | Gebhart et al. ............ 709/206 |
| 7,089,555 B2 * | 8/2006 | Calvignac et al. .......... 718/100 |
| 7,143,414 B2 * | 11/2006 | Heddes et al. .............. 718/102 |
| 2003/0115358 A1 * | 6/2003 | Yun ............................ 719/313 |

* cited by examiner

*Primary Examiner*—Bharat Barot
(74) *Attorney, Agent, or Firm*—Sawyer Law Group LLP

(57) ABSTRACT

An efficient method for performing state based ingress packet selection for a packet processing system in a network processor is disclosed. With this method, each set of message classes is associated with a state of an application, and each set of message classes is assigned to a semaphore. The application blocks one of the semaphores based on its current state. When a message is received, and the message belongs to a class assigned to the blocked semaphore, the blocked semaphore is signaled. The blocked semaphore then wakes the application. In this manner, when the application is awakened, it is guaranteed to find a message that it is interested in processing in its current state, resulting in greater efficiency in the processing of ingress messages.

6 Claims, 4 Drawing Sheets

METHOD AND SYSTEM FOR PROCESSING INGRESS MESSAGES FOR A STATE BASED APPLICATION ASSOCIATED WITH A NETWORK PROCESSOR

FIELD OF THE INVENTION

The present invention relates to applications executed by network processors, and more particularly, to the processing of ingress packets by the applications.

BACKGROUND OF THE INVENTION

FIG. 1 illustrates a conventional network processor system. The system includes a network processor 102 executing an operating system (OS) 108, and one or more state based applications 104 executed by the OS 108. In conventional message processing systems, ingress messages 106 are categorized into classes based on what they accomplish and/or their priority. At any given time, an application 104 may be interested in an ingress message 106, based on the class in which the message 106 belongs and the current state of the application 104.

After the applications 104 are powered on, they eventually reach a state where they are ready and able to receive operational messages. One conventional approach in processing ingress messages is to use a single message queue for all messages. As each message is dequeued, the application 104 "wakes", after which it determines if it is interested in the message 106 from the queue. If so, then the message 106 is processed by the application 104. If not, the message 106 is either dropped or deferred by putting it back in the queue. However, with this approach, the application 104 wakes each time a message 106 is received, even if the application 104 is not interested in the message. This approach is thus inefficient and results in the slow execution of the application 104. In addition, not all network processors have the defer capability. Even when it is available, messages of the same class can be processed out of order. A single message queue also may not be able to supply the number of priority levels needed by the application 104.

Another conventional approach is to use one message queue per class and for the application 104 to wait on the appropriate queue. This approach is efficient only if the application 104 is interested in just one message class and blocks on the corresponding queue. However, when the application 104 wishes to receive more than one class of messages, the application 104 will only see class of messages from the queue at which it is blocking, and will not see any of the messages from the other classes of messages at other queues. One technique is to poll for available messages. At regular intervals, the application 104 checks for a message in each queue in which it is interested. However, this approach has an inherent latency since pending messages will not be detected until the next poll cycle. In addition, polling creates overhead for the network processor 102, even when there are no messages in the interested queues. This approach is thus inefficient and results in the slow execution of the application 104.

Accordingly, there exists a need for a more efficient method for performing state based ingress packet selection for a packet processing system in a network processor. The present invention addresses such a need.

SUMMARY OF THE INVENTION

An efficient method for performing state based ingress packet selection for a packet processing system in a network processor is disclosed. With this method, each set of message classes is associated with a state of an application, and each set of message classes is assigned to a semaphore. The application blocks one of the semaphores based on its current state. When a message is received, and the message belongs to a class assigned to the blocked semaphore, the blocked semaphore is signaled. The blocked semaphore then wakes the application. In this manner, when the application is awakened, it is guaranteed to find a message that it is interested in processing in its current state, resulting in greater efficiency in the processing of ingress messages.

DETAILED DESCRIPTION

The present invention provides a more efficient method for performing state based ingress packet selection for a packet processing system in a network processor. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 through 4 in conjunction with the discussion below.

Figure 1:
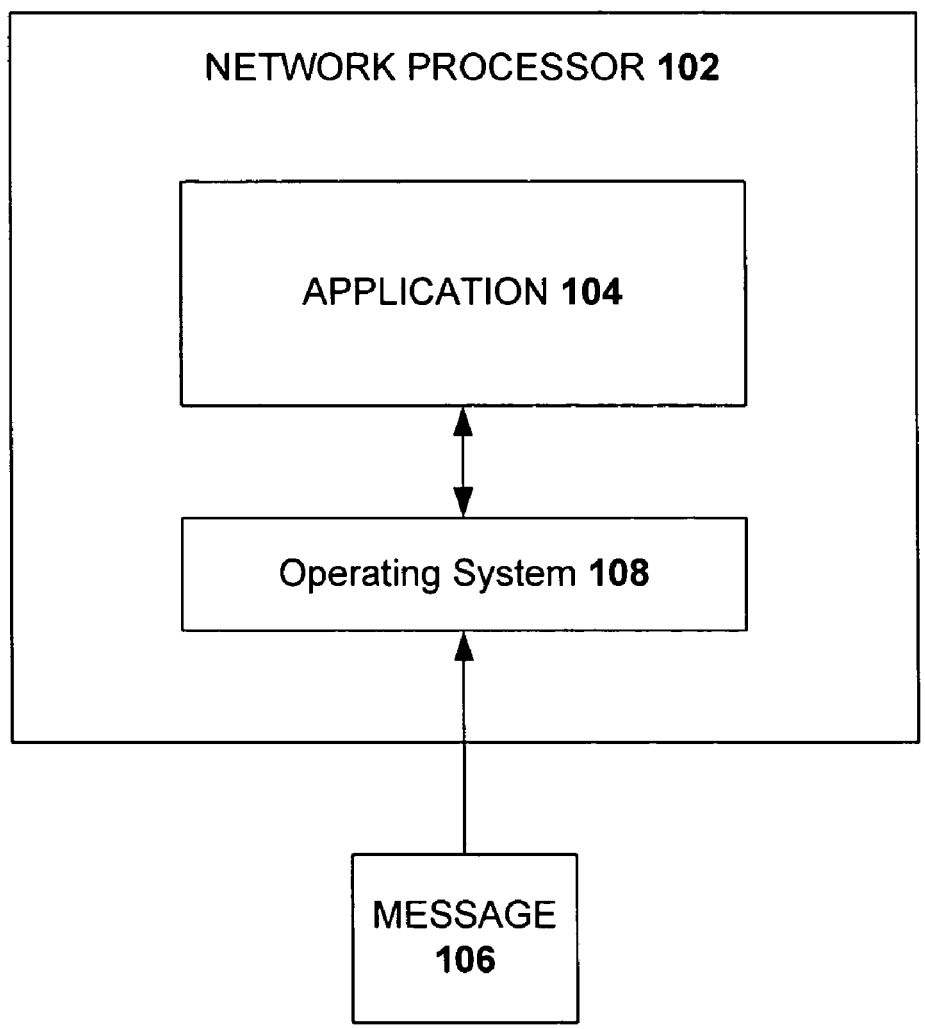
FIG. 1 illustrates a conventional network processor system.
Figure 2:
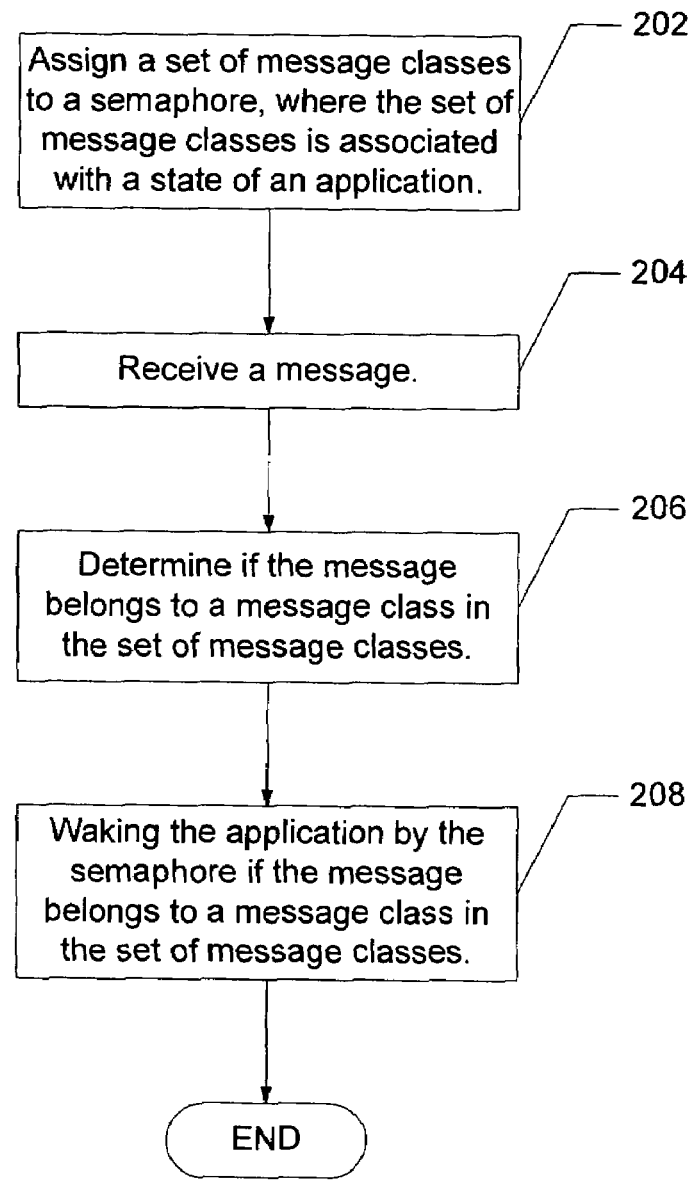
FIG. 2 is a flowchart illustrating a preferred embodiment of a method for performing state based ingress packet selection for a packet processing system in a network processor in accordance with the present invention.
Figure 3:
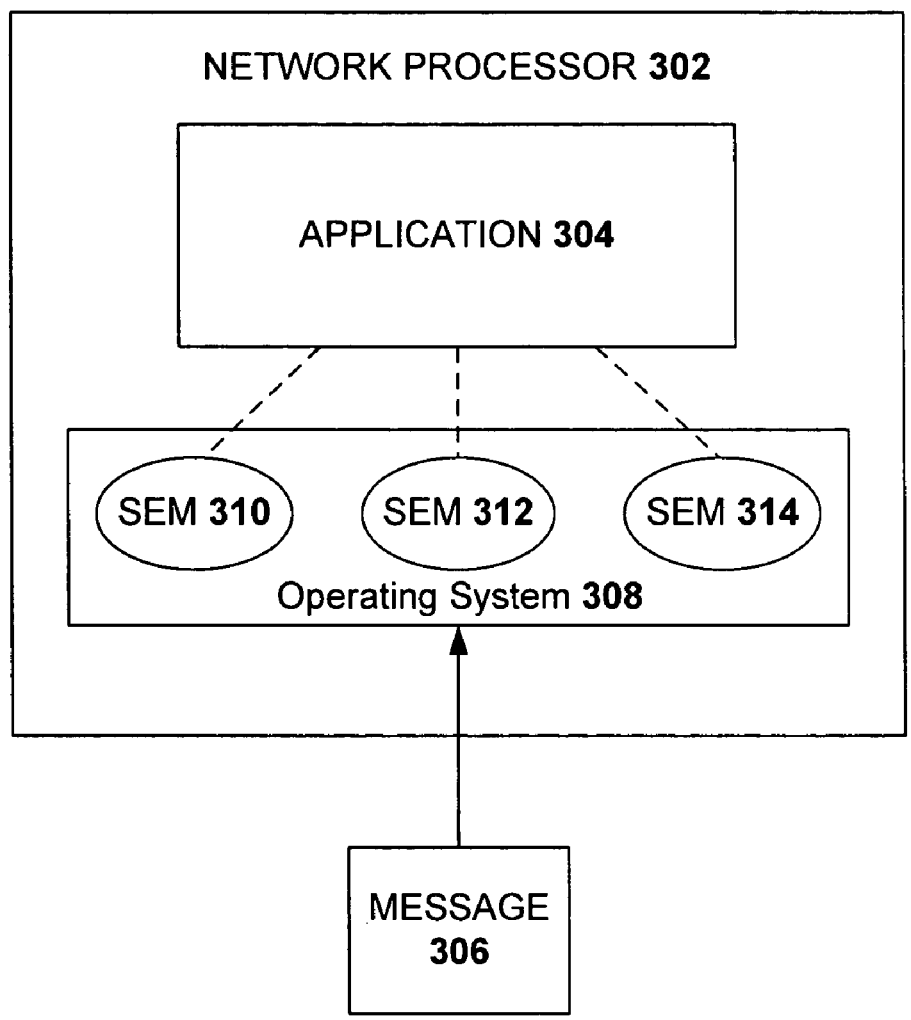
FIG. 3 illustrates a preferred embodiment of a network processor system utilizing the method in accordance with the present invention.

FIG. 2 is a flowchart illustrating a preferred embodiment of a method for performing state based ingress packet selection for a packet processing system in a network processor in accordance with the present invention. FIG. 3 illustrates a preferred embodiment of a network processor system utilizing the method in accordance with the present invention. Referring to both FIGS. 2 and 3, first, a set of message classes are assigned to a semaphore 310, via step 202, where the set of message classes is associated with a state of an application 304. The set of message classes and the set of application states are defined at application design time. Associating a set of message classes with a state of an application means that the application is interested in ingress messages that belong to the set of message classes while it is in that state. A semaphore is a basic facility of the operating system (OS) 308. Semaphores are used to wake applications and are known in the art. The present invention utilizes a semaphore 310 by assigning a set of message classes to the semaphore 310. When a message 306 is received, via step 204, the OS 308 determines if the message 306 belongs to a message class in the set of message classes, via step 206. If so, then the semaphore 310 assigned the set of message classes wakes the application 304. Since the set of message classes are assigned to the semaphore 310, and since the set of classes are associated with a state of the application interested in messages belonging to the set of classes, the semaphore 310 only wakes the application 304 when a message in which the application is interested is received.

Figure 4:
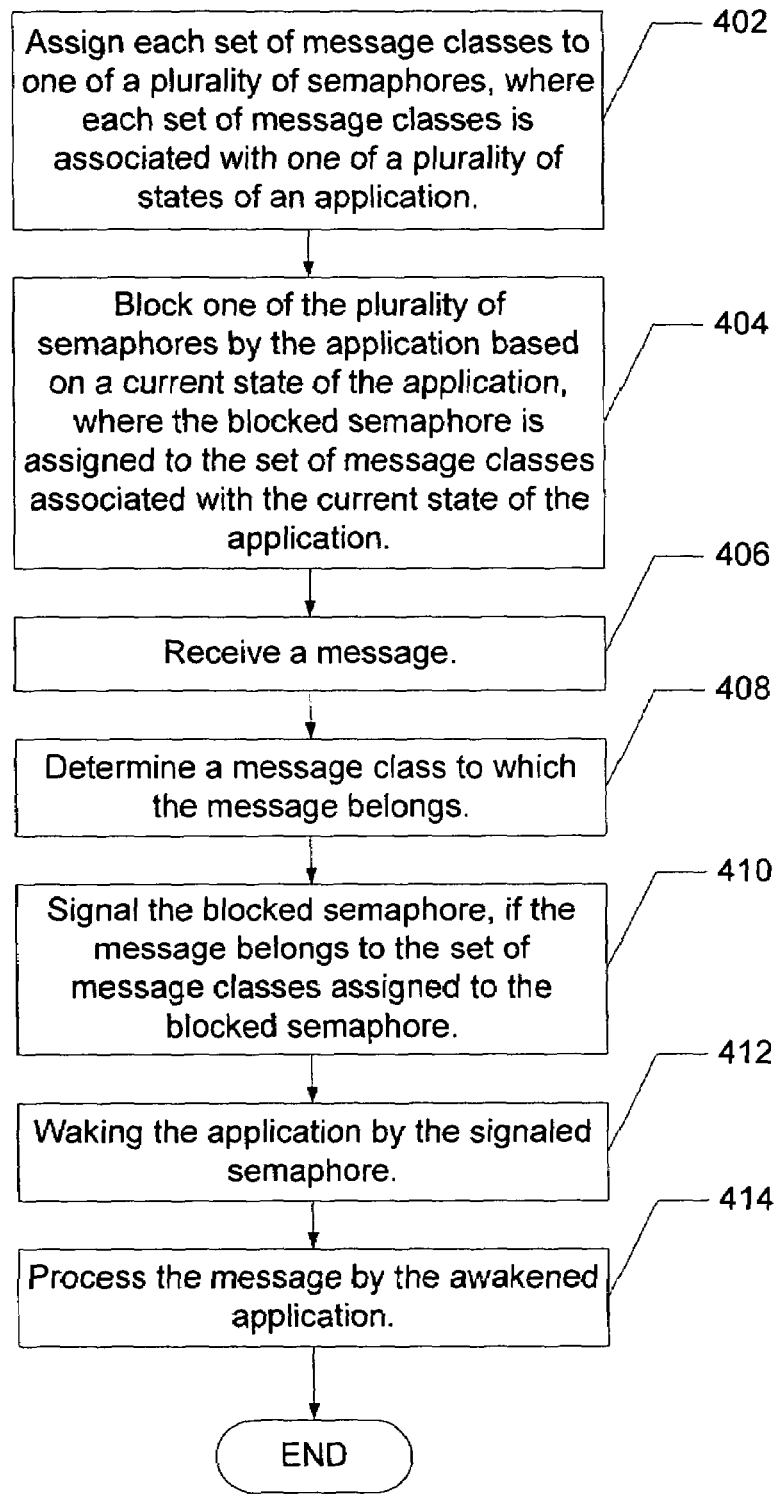
FIG. 4 is a flowchart illustrating in more detail the method for performing state based ingress packet selection for a packet processing system in a network processor in accordance with the present invention.

FIG. 4 is a flowchart illustrating in more detail the method for performing state based ingress packet selection for a packet processing system in a network processor in accordance with the present invention. Assume that a set of message classes (c1, c2, etc.) and a set of application states (s1, s2, etc.) are defined at application design time. A mapping is established from each application state to a set of message classes that can be received while in that state. The following is an example mapping:

s1->(c1, c2)
s2->(c3)
s3->(c2, c3, c4)
s4->(c1, c2)

In this example, when an application is in state s1, it is interested in messages belonging to classes c1 and c2; when in state s2, it is interested in messages belonging to class c3; when in state s3, it is interested in messages belonging to classes c2, c3, and c4; and when in state s4, it is interested in messages belonging to classes c1, and c2.

According to the present invention, each set of message classes (c1, c2, etc.) is assigned to one of a plurality of semaphores 310-314, via step 402, where each set of message classes is associated with one of a plurality of states of the application 304. For the above example, the following assignments are made:

(c1, c2)->SEM 310
(c3)->SEM 312
(c2, c3, c4)->SEM 314

The set of message classes containing c1 and c2 is assigned to semaphore 310; the set of message classes containing c3 is assigned to semaphore 312; and the set of message classes containing c2, c3, and c4 is assigned to semaphore 314.

Next, the application 304 blocks one of the plurality of semaphores 310-314 based on its current state, via step 404. For example, if the application 304 is currently in s1, it blocks semaphore 310; if the application 304 is currently in s2, it blocks semaphore 312; and if the application 304 is currently in s3, it blocks semaphore 306.

When the OS 308 receives a message 306, via step 406, it determines the message class to which the message 306 belongs, via step 408. The OS 308 then signals the blocked semaphore, if the message belongs to the set of message classes assigned to the blocked semaphore, via step 410. The signaled semaphore then wakes the application 304, via step 412.

For example, if the application 304 blocked semaphore 310, and the message 306 belongs to c1 or c2, then semaphore 310 is signaled, via step 410, since the set of message classes containing c1 and c2 was assigned to semaphore 310. Semaphore 310 then wakes the application 304, via step 412. If the application 304 blocked semaphore 312, and the message 306 belongs to c3, then semaphore 312 is signaled, via step 410, since the set of message classes containing c3 was assigned to semaphore 312. Semaphore 312 then wakes the application 304, via step 412. If the application 304 blocked semaphore 314, and the message 306 belongs to c2, c3, or c4, then semaphore 314 is signaled, via step 410, since the set of message classes containing c2, c3, and c4 was assigned to semaphore 314. Semaphore 314 then wakes the application 304, via step 412. Once awake, the application 304 processes the message 306, via step 414.

In this manner, when the application is awakened, it is guaranteed to find a message that it is interested in processing in its current state. If there are no messages, none of the semaphores are signaled, and the application continues to block. Other applications can be scheduled on the processor. Thus, with the present invention, no polling is needed to check for messages when there are no messages.

When a message is received but the application is not interested in that message, i.e., the message does not belong to a class assigned to the blocked semaphore, the message can either be dropped or deposited to a buffer to be processed if the application enters the state that is interested in the message.

A more efficient method for performing state based ingress packet selection for a packet processing system in a network processor has been disclosed. With this method, each set of message classes is associated with a state of an application, and each set of message classes is assigned to a semaphore. The application blocks one of the semaphores based on its current state. When a message is received, and the message belongs to a class assigned to the blocked semaphore, the blocked semaphore is signaled. The blocked semaphore then wakes the application. In this manner, when the application is awakened, it is guaranteed to find a message that it is interested in processing in its current state, resulting in greater efficiency in the processing of ingress messages.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for processing ingress messages for a state based application being executed by network processor, the state based application having a first state and a second state, the method comprising:

associating the first state of the state based application to a first set of message classes that are receivable by the state based application while the state based application is in the first state;

associating the second state of the state based application to a second set of message classes that are receivable by the state based application while the state based application is in the second state, the second set of message classes being distinct from the first set of message classes;

assigning the first set of message classes to a first semaphore;

assigning the second set of message classes to a second semaphore;

responsive to the state based application being in the first state, the method further includes
  the state based application blocking the first semaphore; and
  the first semaphore waking the state based application to process an ingress message responsive to the ingress message belonging to the first set of message classes, otherwise the ingress message is dropped; and responsive to the state based application being in the second state, the method further includes the state based application blocking the second semaphore; and the second semaphore waking the state based application to process an ingress message responsive to the ingress message belonging to the second set of message classes, otherwise the ingress message is dropped.

2. The method of claim 1, wherein the first set of message classes categorize ingress messages having a different priority relative to ingress messages categorized by the second set of message classes.

3. The method of claim 1, wherein the first set of message classes categorize ingress messages having a different function relative to ingress messages categorized by the second set of message classes.

4. A computer readable medium encoded with a computer program for processing ingress messages for a state based application being executed by network processor, the state based application having a first state and a second state, the computer program comprising computer executable code for:

associating the first state of the state based application to a first set of message classes that are receivable by the state based application while the state based application is in the first state;

associating the second state of the state based application to a second set of message classes that are receivable by the state based application while the state based application is in the second state, the second set of message classes being distinct from the first set of message classes;

assigning the first set of message classes to a first semaphore;

assigning the second set of message classes to a second semaphore;

responsive to the state based application being in the first state, the method further includes the state based application blocking the first semaphore; and the first semaphore waking the state based application to process an ingress message responsive to the ingress message belonging to the first set of message classes, otherwise the ingress message is dropped; and responsive to the state based application being in the second state, the method further includes the state based application blocking the second semaphore; and the second semaphore waking the state based application to process an ingress message responsive to the ingress message belonging to the second set of message classes, otherwise the ingress message is dropped.

5. The computer readable medium of claim 4, wherein the first set of message classes categorize ingress messages having a different priority relative to ingress messages categorized by the second set of message classes.

6. The computer readable medium of claim 4, wherein the first set of message classes categorize ingress messages having a different function relative to ingress messages categorized by the second set of message classes.

* * * * *